United States Patent [19]

Ihms

[11] 4,133,602
[45] Jan. 9, 1979

[54] METHOD FOR PRODUCING COLOR STRUCTURE CHANGE THROUGH INTERACTION OF LIGHT SOURCES AND APPLICATION TO IMPROVED APPARATUS FOR STEREOSCOPIC PHOTOGRAPHY

[76] Inventor: James E. Ihms, 1569 W. Hazelwood, Phoenix, Ariz. 85018

[21] Appl. No.: 743,460

[22] Filed: Nov. 19, 1976

Related U.S. Application Data

[63] Continuation-in-part of Ser. No. 412,760, Nov. 5, 1973, abandoned, which is a continuation-in-part of Ser. No. 375,335, Jul. 2, 1973, Pat. No. 3,846,810, and Ser. No. 536,448, Dec. 26, 1974, Pat. No. 4,009,951.

[51] Int. Cl.² ...................... G03B 21/14; G02B 27/22
[52] U.S. Cl. ........................................ 350/132; 353/7; 353/10; 353/84
[58] Field of Search ...................... 353/7, 8, 9, 10, 84; 350/132

[56] References Cited

U.S. PATENT DOCUMENTS 2,674,919  4/1954  Rodriguez ............................. 353/7
3,019,704  2/1962  Zillmer ................................. 353/84

OTHER PUBLICATIONS

*An Astonishing New Theory of Color*, Francis Bello, Fortune Magazine, May 1959, pp. 144-148.
*Experiments in Color Vision*, Edwin Land, Scientific American, May 1959, pp. 84-99.
*Anaglyph*, article in Focal Encyclopedia of Photography, p. 42.

Primary Examiner—Steven L. Stephan
Attorney, Agent, or Firm—Warren F. B. Lindsley

[57] ABSTRACT

Apparatus for controlling the interaction of light sources to produce a decodable composite image which image may have three dimensional characteristics and including color filterization and light control biologically producing depth and measurement thereof.

4 Claims, 24 Drawing Figures

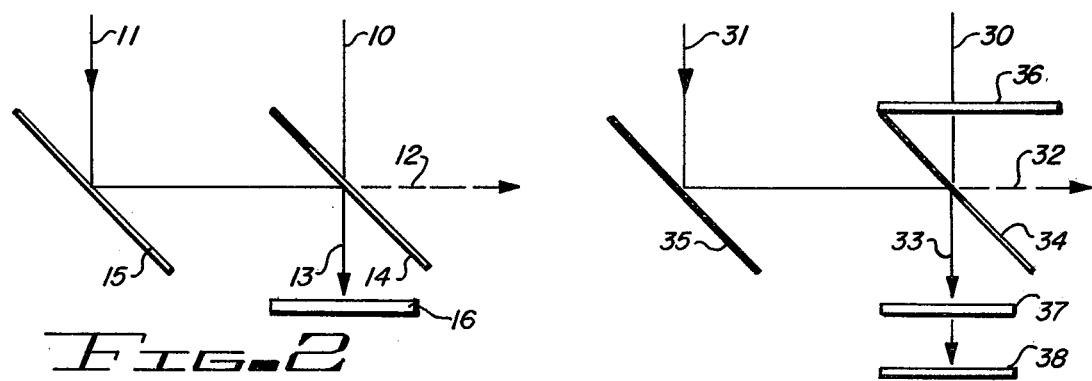
FIG-2
FIG-4
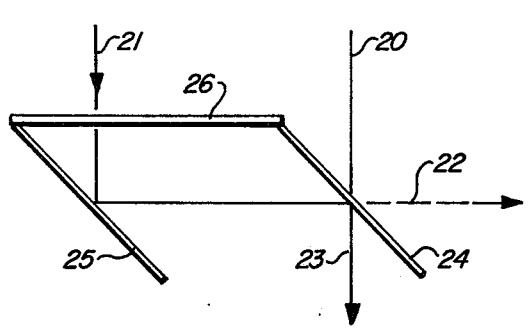
FIG-3
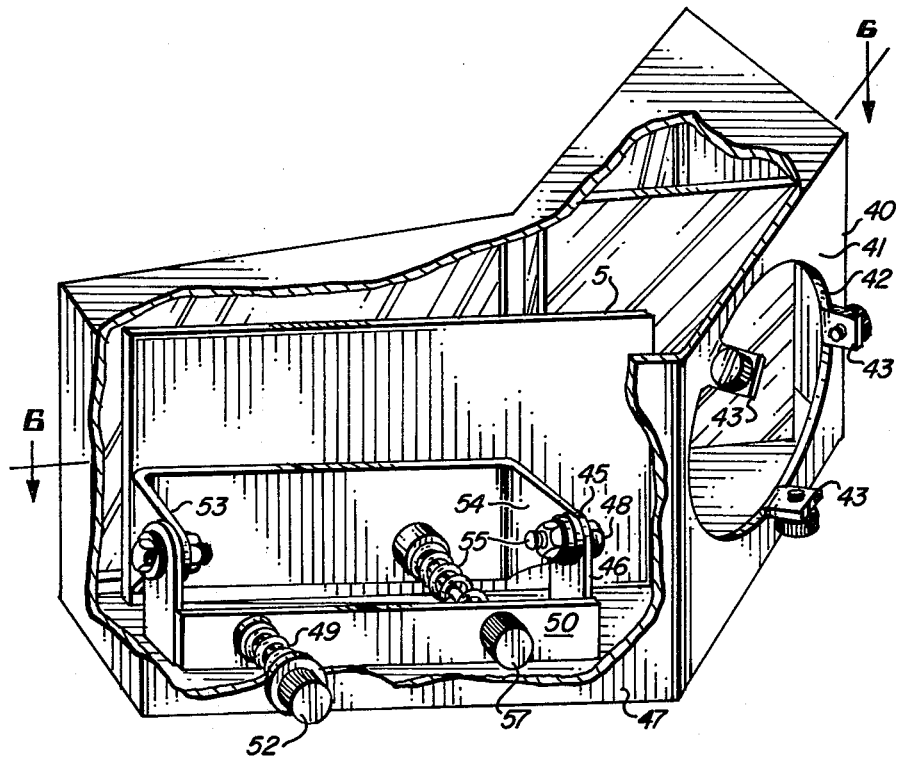
FIG-5

METHOD FOR PRODUCING COLOR STRUCTURE CHANGE THROUGH INTERACTION OF LIGHT SOURCES AND APPLICATION TO IMPROVED APPARATUS FOR STEREOSCOPIC PHOTOGRAPHY

BACKGROUND OF THE INVENTION

The present application is a continuation-in-part of a patent application entitled "IMPROVED APPARATUS FOR STEREOSCOPIC PHOTOGRAPHY", Ser. No. 412,760, filed on Nov. 5, 1973, now abandoned, which is a continuation-in-part of a patent application entitled "APPARATUS FOR STEREOSCOPIC PHOTOGRAPHY", Ser. No. 375,335, filed July 2, 1973, now U.S. Pat. No. 3,846,810 and U.S. Patent Application Ser. No. 536,448, filed Dec. 26, 1974 entitled "IMPROVED APPARATUS FOR STEREOSCOPIC PHOTOGRAPHY", now U.S. Pat. No. 4,009,951, all describing related inventions of the present Applicant.

The present invention pertains to three-dimensional photography and, more particularly, to apparatus attachable to a camera for obtaining a single photographically recorded full-color content composite image containing the requisite information content to provide a plane or three dimensional view of a photographed scene.

Stereoscopic photography has had cyclic public appeal since approximately 1839 when the first black and white stereo photographs were made. The stereo concept then employed can be traced to thoughts first propounded by Leonardo de Vinci in 1584.

Traditional stereo photography may be described as two laterally displaced essentially simultaneously exposed negatives, positives, or impressions in the case of television taken to obtain two images of a scene. The images are slightly different because of the lateral displacement, resulting in slightly different lines of sight of the scene. For best real life simulation, the lateral displacement should be equivalent to the distance between the viewer's eyes. The negatives, positives, or impressions are viewed through a stereo opticon device, which device permits each eye to see only one of the images portrayed by the negatives, prints, or impressions. The difference in the two images seen by a viewer is translated by the viewer's brain into a sense of depth to give the viewed scene a three-dimensional quality.

If colored images, rather than black and white images, are feasible, image decoding techniques other than physical separation of two images when viewed can be used. The separation may be effected by producing a first image along one line of sight of a scene which is limited in color content by a filter to one-half of the visible light spectrum and producing a second image along another line of sight of a scene which is limited in color content by a filter to the remaining half of the visible color spectrum. The two images are combined to form an anaglyph and projected onto a common screen for a movie or slide show, or printed upon a printing medium. The resulting anaglyph is viewed by placing a different color filter in front of each eye. The filters, usually being essentially, but not completely mutually exclusive, permit each eye to see only one of the color limited images of the scene. As each eye only sees one of the images, each eye sees the same scene but as viewed along a slightly different line of sight. Thus, a slight discrepancy exists in the scene presented to each eye. This discrepancy is translated by the brain to provide a sense of depth and hence, provides a three-dimensional effect to the scene photographed.

The advances since 1839 in both black and white and color stereo photography have been essentially limited to improvements in equipment resulting in greater registration, better optics and improved projection systems. Despite the amount of work done and the many improvements generated, no significant substantive changes in the three dimensional image reproduction have been developed. That is, the methods for effecting stereo photography have remained unchanged by the prior art.

In example, because of the requirement of double negatives in early stereoscopic photography, various devices have been developed to portray the necessary information on a single negative. U.S. Pat. No. 2,639,653 illustrates apparatus using a rotatable disc or sliding diaphragm adjacent to the objective lens to obtain slightly different views of the same scene. A specially constructed viewing device displays one of the views to each eye of the observer. Thus, a stereo scopic effect is achieved.

In U.S. Pat. No. 2,317,875, a plurality of rectangular prisms are employed to form a plurality of picture strips, each strip conveying a part of the picture. Alternative ones of the strips from the total picture are transmitted through a first lens system. The remaining strips from the total picture are transmitted through a second lens system. The stereoscopic effect is obtained by viewing the strip composite through a special viewer, which viewer segregates one set of strips to impinge upon one eye and the other set of strips to impinge upon the other eye.

In the apparatus described in U.S. Pat. Nos. 2,360,322 and 2,751,826, two color segregated images taken along different lines of sight of the same scene are received and simultaneously recorded on the same piece of film. In operation, a first bundle of light rays are transmitted through and limited in color content by a first filter impinging upon one surface of an angled semi-reflecting mirror with some of the light rays being reflected therefrom and the remaining light rays being transmitted therethrough. A second bundle of light rays are transmitted through and limited in color content by a second filter, reflected by a mirror to impinge upon the semi-reflecting mirror with some of the light rays being reflected therefrom and the remaining light rays being transmitted therethrough. The first and second filtered bundle of light rays are essentially mutually exclusive in color content by action of the first and second filters. The light rays of the first bundle transmitted through the semi-reflecting mirror are combined with the light rays of the second bundle reflected by the semi-reflecting mirror to form an anaglyph. The anaglyph is recorded on film and viewed through glasses having filters corresponding to the first and second filters. A disadvantage of this system is that neither image is of full color content. Moreover, the images are not completely mutually exclusive in color as reciprocally exclusive filters cannot be manufactured, thus, color cross talk, color composites or non-filterable areas will be present. Further, less than half of the light content of the light rays transmitted through the corresponding filters and less than half of the light content of the light rays is transmitted through the semi-reflecting surface. Thus, the light content of the composite image striking the film is less than one-half of the total light content of the two received light rays.

Semi-reflecting mirrors or surfaces are normally coated with a substance to render them semi-reflecting. The coating substance deteriorates the quality of each image because of the impurities inherent within the coating substance, as well as each light source is again reduced another 50% by the half silvered mirror.

A recent U.S. Pat. No. 3,712,199 teaches apparatus for producing an image to provide a psychophysiological illusion of depth. This system, contrary to most stereoscopic systems, does not capture two laterally displaced images. Instead, a single line of sight is employed in photographing the object. Within the lens system itself, one-half of the received light rays are filtered by a first color filter while the second half of the received light rays are filtered through a second color filter. Both filtered light rays are combined to form an anaglyph. The anaglyph is viewed through colored glasses having each lens corresponding to one of the color filters. Thus, one eye of the viewer can detect only that portion of the anaglyph transmitted through the second color filter of the lens system. As there is no initial lateral separation of the two color segregated images, the anaglyph is not a true three-dimensional image but appears to present the illusion of a three-dimensional image.

It may be noted that all of the above described apparatus produce a pair of superimposed color mutually exclusive images through use of a pair of mutually exclusive color filters and the resulting anaglyph is viewed through colored glasses having lenses corresponding to the color filters.

The closest prior art known to Applicant, and substantiated by Dr. Peter Franken, Director of the Optical Science Center at Arizona State University, is described in an article entitled "An Astonishing New Theory of Color", appearing in the May, 1959 issue of *Fortune*. The article describes the exploratory work performed by Dr. Edwin H. Land in 1955. In essence, Dr. Land obtained a first transparency taken through a red filter and a second combined transparency taken through a green filter and blue filter. The image of the first transparency (first image) was projected onto a screen after being filtered through a red filter. The image of the second transparency (second image) was superimposed onto the first image by projecting it with the aid of a white light source. Both projected images were carefully adjusted to be in registration with one another. The resulting composite image had a full color content which Dr. Land could not explain. Instead, he considered it to be physiological phenomenon as he could not capture it on a light sensitive medium, i.e. film. This work by Dr. Land helped form the basis of the present invention.

Other United States patents directed to various three-dimensional photographic apparatus include: U.S. Pat. Nos. 475,084; 1,595,984; 2,045,119; 2,386,413; 2,749,820; 2,895,374; 3,642,349; 2,301,254 and 2,568,327.

SUMMARY OF THE INVENTION

It is therefore a primary object of the present invention to provide apparatus for producing a composite image of a scene, which image has a three-dimensional quality.

Another object of the present invention is to provide apparatus for simultaneously superimposing two various color content but full color images of the same scene taken along different lines of sight.

A further object of the present invention is to provide a dual input aperture filter system for cameras, which filter system combines a filtered image and a white light image of a photographed scene and transmits the combined image to a light sensitive medium.

A still further object of the present invention is to provide a means for combining two full color but different color content images corresponding to two views along various lines of sight of the same object to produce a composite decodable image, which image has a three-dimensional quality after decoding.

A still further object of the present invention is to provide an attachment for a camera to combine two full color content images into a decodable composite image recordable to the light sensitive medium of the camera.

A still further object of the present invention is to transform two white light images of a scene into a non-anaglyph composite image formed of two segregable images with a single color filter.

A still further object of the present invention is to provide a means for combining two black and white images, each image corresponding to one of two views of the same object to produce a composite decodable image, which decodable image has a three-dimensional quality after decoding.

A still further object of the present invention is to provide a means for combining a black and white image with a color filtered black and white image, each image corresponding to one or two views of the same object to produce a composite decodable image, which decodable image has a three-dimensional full color quality after decoding.

Yet another object of the present invention is to provide a method for modifying the color structure of a first light source through interaction with a second light source, the resulting modified light source containing full color quality embodied in a narrow-frequency spectrum heretofore considered monochromatic.

These and other objects of the present invention will become apparent to those skilled in the art as the description thereof proceeds.

BRIEF DESCRIPTION OF THE DRAWING

The present invention may be described with more specificity and clarity with reference to the following figures, in which:

FIG. 2 illustrates the basic image combining a light interaction system of the present invention.

FIG. 3 illustrates a variation of the system shown in FIG. 2.

FIG. 4' illustrates a camera lens having two apertures, one of which is provided with a filter.

FIG. 5 illustrates a perspective view of focusing and alignment apparatus useable with the present invention.

DESCRIPTION OF THE PREFERRED EMBODIMENT

The appearance of three-dimensionally in images can be created by superimposing two different views of the same scene to form a composite image. The illusion of depth is often enhanced if the composite image is viewed through an image decoding device. If the two views are laterally displaced from one another by an amount approximately equal to the distance between a viewer's eyes, the resulting image will have essentially the same three-dimensional appearance as if the viewer were seeing the scene personally. Where the separation is greater than that between the viewer's eyes, the three-dimensional effect is exaggerated. Similarly, if the distance is less, the three-dimensional effect is minimized. The composite is in register at the point where the two lines of sight cross one another. Those elements of the scene being closer or further away will be out of register. This situation is similar to that which occurs in real life.

Figure 1:
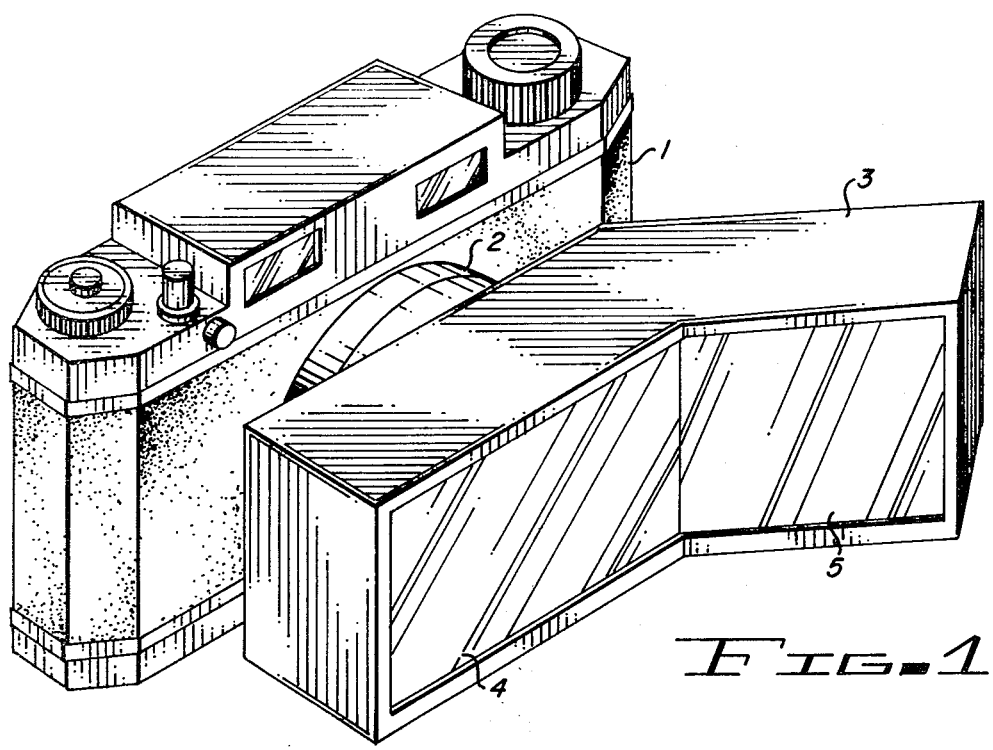
FIG. 1 illustrates the present invention attached to the lens of a camera.

Referring to FIG. 1, there is shown apparatus incorporating the present invention and used in conjunction with a camera for obtaining a composite image of a scene, which scene is viewed along two different lines of sight. Camera 1, which may be a highly complex instrument or a very simple camera, such as those cameras sold by the Eastman Kodak Company under the trademark "Instamatic", includes a lens system 2. A housing 3 is detachably secured to the lens system. The exact means and mode of attaching the housing may, of course, be varied to suit the lens system.

Housing 3 includes a light interacting surface, such as light transmissive element 4, which element may be a color filter or a smooth surfaced transparent element and a light reflective element 5, which may be a mirror. The distance between the centers of elements 4 and 5 is approximately two and one-half inches, or, the average distance between a person's pupils. For special needs or effects, the distance may be increased or decreased.

Figure 1A:
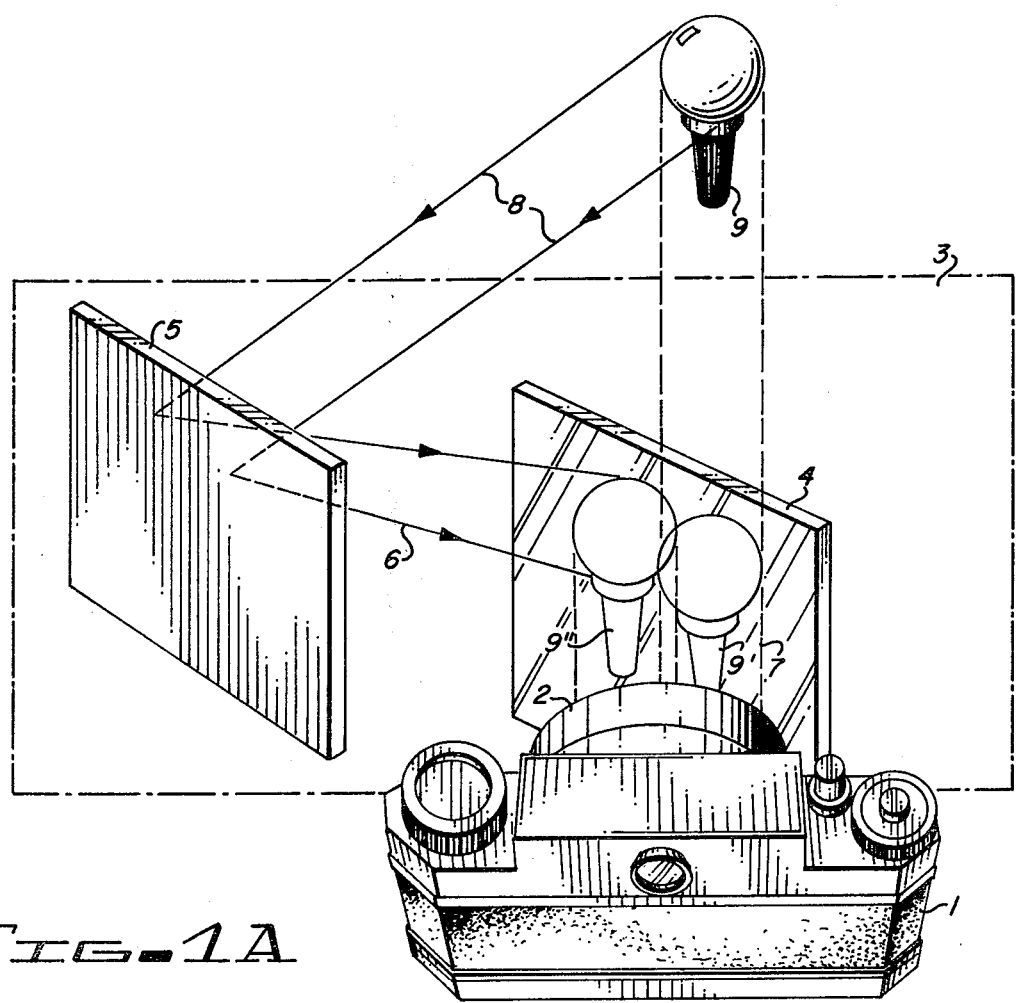
FIG. 1A is a diagramatic illustration of the present invention.

An illustration of the operation of the present invention is shown in FIG. 1A. A first bundle of light rays from object 9 will impinge upon the front surface of light transmissive element 4. At least a part of the first bundle of light rays will be transmitted therethrough into lens system 2 into camera 1. The transmitted first bundle of light rays is identified by numeral 7 and will define a first image 9' of object 9. A second bundle of light rays 8 are reflected by light reflective element 5 to the rear surface of light transmissive element 4 and define a second image identified by numeral 9".

In the embodiment illustrated in FIG. 1A, the light transmissive element 4 is a color filter such as a red filter. Hence, the first bundle of light rays 7 impinging upon the red filter is modified in color content by the filtering action of the red filter. It now becomes evident that each of two bundles of light rays, which differ in color content, intersect one another at the light transmissive element 4.

When two light beams intersect one another at a light transmissive surface (i.e. light transmissive element 4), an interaction of the light beams will occur. That is, the light beams will serve as mutual color filters for one another such that each of the reflected and transmitted beams of light of each impinging beam of light will be altered in color content. This is a theory of the inventor which constitutes an explanation of the results set forth herein. Thus, the images identified by numerals 9' and 9" correspond to the image presented by the first and second bundle of light rays, respectively, except as modified in color content by the light interaction occurring at transmissive element 4.

More specifically, the first bundle of light rays has been limited in color content to one segment of the visible light spectrum. This first bundle of light's rays, interacting with the second bundle of light rays will tend to modify the color content of the latter. Conversely, the second bundle of light rays, being initially essentially white light, will modify or add to the color content of the first bundle of light rays because of the light interaction occurring at transmissive element 4. Thus, each of images 9' and 9" is not limited in color content to one or another half of the visible light spectrum. Instead, each image 9' and 9" may contain a full range of colors.

By experiment, it has been learned that the composite image formed by images 9' and 9" contains two full color images, one corresponding in subject content to the first bundle of light rays and the other corresponding in subject content to the second bundle of light rays. The two images, after being recorded on a photo sensitive medium as the composite image, are segregable from one another by viewing the composite image through a pair of glasses having a red and a cyan lens. When so viewed, the composite image has the depth of a three-dimensional representation.

The light paths within housing 3 are shown schematically in FIG. 2. A first light ray 10 emanating from an object to be photographed is received by and transmitted through light transmissive element 14. If light transmissive element 14 is a color filter, it will transmit the filtered light rays of the first light ray 10 which form a part of the bundle of light rays identified as composite ray 13.

A second light ray 11 represents the light rays emanating from the same object as light ray 10. However, light ray 11 is angularly displaced from light ray 10, which displacement results in some differences in subject matter content between the two rays. The totality of light ray 11 is reflected by light reflective element 15 to the light transmissive element 14. If the light transmissive element 14 is a red color filter, it will reflect some of the light rays of the second light ray 11 which form a part of the bundle of light rays identified as composite ray 13. Numeral 12 identifies the light rays of light ray 10 and the transmitted light rays of light ray 11.

From the above description, it may be understood that the color content of the contributions to composite ray 13 of light rays 10 and 11 are altered in color content such that each of the images represented therein is of full color content.

In the preferred embodiment, the light transmissive element has been selected as a red color filter because it comes close to transmitting half of the visible light rays from a white light source and reflecting the remaining visible light rays. Hence, it is believed that the most complete interaction of light rays will therefore occur at light transmissive element 14. However, it is to be understood that other color filters may be employed without departing from the teachings of the present invention.

The information contained within composite light ray 13 is sufficient to produce two superimposed images of an object where each image portrays the object as seen along one of two angularly displaced views. One image is formed by the light rays transmitted through a filter while the other image is formed by the light rays reflected by the same filter. These images are recorded upon a light sensitive medium 16.

The illumination provided by either light rays 10 and 11 is diminished by the light transmissive element 14. However, as the light rays of light ray 10 that are filtered by the red filter are combined with the reflected light rays of light ray 11, the composite light ray 13 includes essentially the same illumination as either of light rays 10 or 11. Thus, the aperture or speed of the lens system 2 of camera 1 (see FIG. 1) using the present invention may not need to be adjusted to accommodate the filtering of the incoming light rays.

The photographic recording medium, either positive or negative color film, within the camera exposed by composite light ray 13 will respond to the composite light ray and record both images thereon as a composite image. The images will be essentially in registration and the resulting positive or print will be of acceptable quality for general viewing purposes. When the positive is projected onto a screen for viewing or when a print of the negative or positive is viewed, the viewer may or may not obtain a sensation of third dimensionality. If the sensitivity of the viewer's eyes are mismatched in color sensitivity, a sense of three-dimensionality may be readily apparent. To obtain the full effect of a third dimension of the photographed object, the viewer should don a pair of glasses having a blue content lens and a red content lens. The red content lens should be used in front of the eye corresponding to light ray 10 while the blue content lens should be used in front of the eye corresponding to the light ray 11. With this arrangement, one of the viewer's eyes will see the object as conveyed by light ray 10 and the other eye will see the object as conveyed by light ray 11. As each eye sees the object from a different vantage point, or line of sight, the object will appear to be dimensional. That is, the composite image will have depth.

Although the light ray interaction process which occurs at the intersection of the two intersecting light rays is not fully and wholly understood, a hypothesis has been developed. It is known that the light rays from a light source are changed or altered in color and/or tone content to one range of the visible light spectrum when the light rays are reflected from the surface of a color filter; similarly, the light rays are changed or altered in color and/or tone content to another range of the visible light spectrum when the light rays are transmitted through same color filters. As a result, a color filter is capable of producing two different color content images, depending on whether the received image is reflected from or transmitted through the color filter. Based upon the above knowledge, it is hypothesized that the following phenomenon occurs at the plane of interaction between the two intercepting light rays.

The light or image transmitted through the color filter contains areas having the color of the color filter and non-light areas representative of the reflected complementary color (i.e. if the color filter is red, the transmitted image contains red and non light areas representative of blues, greens and yellows of the original image). The light rays from the white light image intercept the filtered light rays. Due to the interaction of the intercepting light rays, the color filter complementary colors (i.e. blues, greens and yellows) impinging upon the non-light areas of the filtered light ray are reflected. Thus, the filtered image striking the recording medium contains the color of the light transmitted through the color filter and the complementary colors introduced by the non-filtered image and reflected by the non-light areas at the plane of interaction. A similar but reversely operating color discrimination process occurs for the received non-filtered image. That is, all of the colors of the non-filtered image are reflected at the plane of interaction to form one image of the composite, which colors are complementary to the filter. The non-complimentary colors are not reflected as they are transmitted through the filter. Hence, they represent non-light areas of the image. These non-light areas will, however, appear to have color due to the addition of color provided by the colors of the filtered image transmitted through the filter at the locations of the non-light areas. Thereby, the image contributed by the received and initially filtered image and the received initially non-filtered image to the composite image will have full color and can be selectively viewed through a colored eyepiece (red for the initially filtered image and blue for the initially non-filtered eyepiece if the filter is red colored).

In further explanation, one could categorize the color combining phenomenon as employing both additive and subtractive color processes. That is, a non-light area will appear as the complementary color of the filter yet the light areas will appear in various colors and transmit the correct amount of light through the color filter (non-light areas appearing as blue will appear black when added to a red filter, subtractive color, red areas of the same image will appear as light through the same red filter, additive color).

By comparison with prior art devices, the distinction thereover becomes self-evident. The prior art composite image was formed as an anaglyph (two mutually exclusive color content images superimposed on one another) and viewed through eye pieces complementary to the filters.

Another embodiment or variation of the present invention is shown in FIG. 3. A pair of light rays 20 and 21 angularly displaced but emanating from the same object essentially correspond to light rays 10 and 11, respectively. The light transmissive element 24 is a transparent smooth surfaced color filter element. Light ray 20 is passed through and filtered at element 24 by the interaction of intercepting light rays and becomes a part of composite ray 23. Light ray 21 is passed through a non-mutually exclusive color filter 26, which filter may be of any chosen color. Light ray 21 is partially reflected by light reflecting element 25 to element 24. The reflected light rays of light ray 21 become a part of composite light ray 23 due to the interaction of light rays and are transmitted through the lens system into the camera. The content of composite light ray 23 will be a composite of the mechanically filtered and reflected light rays contained within light ray 21 and the color filter light rays contained within light ray 20, both of which are modified in color content due to the interaction of light rays at element 24. Thus, light ray 23 contains sufficient information to form a pair of full color content images, each corresponding to the information contained by one of the incoming light rays. The reflected portion of light ray 20 and transmitted portion of light ray 21 are depicted by numeral 22.

When light ray 23 impinges upon a color sensitive medium, such as a color positive or print, a composite of the two superimposed images will be formed simultaneously. The two images are segregable if the composite image is viewed through a pair of glasses having a red content filter for one lens and a blue content filter for the other lens. The orientation of the filters must match the orientation of rays 21 and 20. One of the viewer's eyes will see the image conveyed by light ray 21 while the other eye will see the image conveyed by light ray 20. The somewhat different images will be converted by the viewer's brain to provide a sense of three-dimensionality to the composite image.

Figure 4:
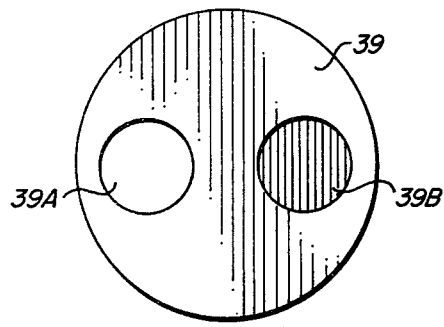
FIG. 4 illustrates a further variation of the system shown in FIG. 2.

Referring to FIG. 4, there is shown a further embodiment or variation of the present invention described with respect to FIG. 2. Herein, a light ray 30, emanating from an object, directly impinges upon and is filtered by a color filter 36. A part of this light ray is transmitted through a transparent, smooth surfaced color filter element 34. The reflected part of light ray 30 is identified by numeral 32. The filtered and transmitted part of light ray 30 forms a part of composite light ray 33. Ray 31, emanating from the same object as light ray 30 but along a different line of sight, is reflected by reflecting element 35 to transparent smooth surface element 34. A part of light ray 31 is again reflected by transparent smooth surface element 34 and forms the remaining part of composite ray 33. The transmitted part of light ray 31 is identified by numeral 32. Partial reflection and transmission of light rays 30 and 31, respectively, occur at element 34 ddue to the interaction of the two intersecting light rays. The composite image formed by composite ray 33 passing through color compensating filter may then be recorded upon a display medium such as a color sensitive film 38 to produce a composite image. The two images of the composite image on film 38, when viewed, are segregated by viewing the composite image through a pair of filtered glasses as described above. Thus, each eye of the viewer will receive the information content of one of light rays 30 or 31. The composite image on film 38 may be also recorded on a positive or a screen.

Figure 4A:
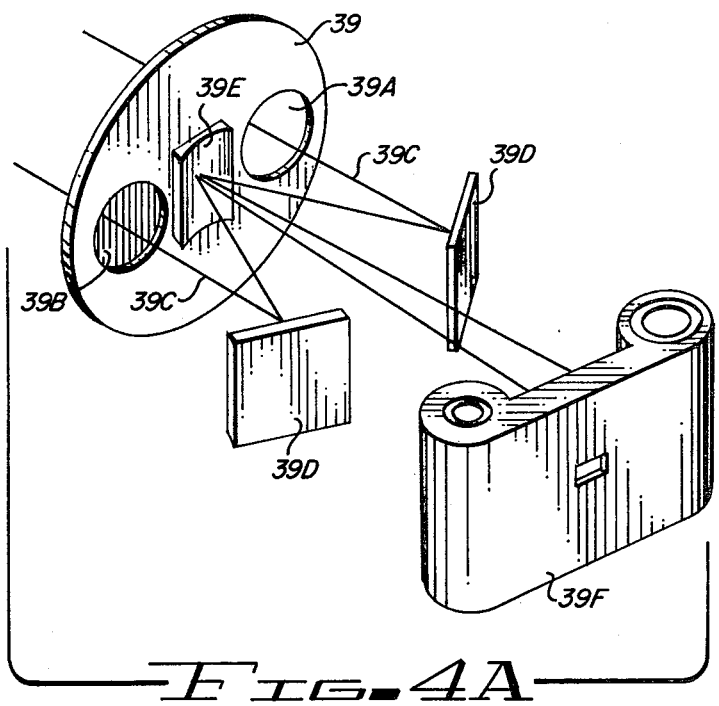
FIG. 4A illustrates a means of utilizing the lens of FIG. 4'.

If the distance between the two apertures needs to be reduced to less than that possible with the above described two element system, a simplified system is still feasible which implements the use of interaction of light in conjunction with a single color filter. By splitting the incoming light within a camera lens 39 into a left 39B and right side 39A as shown in FIG. 4' and filtering one side (such as the right side 39B with a red-orange filter) a composite image of the filtered and unfiltered images will be formed on the light sensitive recording medium (film). The composite image will be an image containing the net result of the interaction of light between the filtered and unfiltered images. Neither image forming the composite image will be mutually exclusive in color and the composite image will possess a three-dimensional quality. Thus, such a camera lens system as shown in FIG. 4A produces the same results as the above described embodiment but requires less lateral displacement. As noted in FIG. 4A the light rays 39C from the area 39A and 39B of lens 39 are reflected off of mirrors 39D and redirected by mirror 39E as to a film 39F.

As described in U.S. Pat. No. 3,846,810 various means may be incorporated for color correction and light path length extension or attenuation.

From experimentation with the apparatus of the present invention, it has been learned that a full color decodable composite image having a three-dimensional quality can be obtained from two black and white positives. A first one of the black and white positives of an object is obtained by conventional means. The second one of the black and white positives of the object is taken through a color filter and along a slightly laterally spaced line of sight. To obtain the composite image, the first positive is placed in one of light paths 11, 21 or 31 and the second positive is placed in one of light paths 10, 20 or 30, depending on whether the apparatus shown in FIGS. 2, 3 or 4 is used. A light source placed on a positive projects the image of the respective positive along one of the identified light paths. The first and second images produced from the first and second positives are combined in an interacting relationship at element 14, 24 or 34, depending on which the apparatus is employed. The resulting composite image (light ray 13, 23 or 33) has a full color content which is directly viewable or recordable upon a color sensitive recording medium. Moreover, the same interaction can also be applied to pairs of previously non-filtered black and white or color images, which have been obtained of a scene along slightly divergent lines of sight (i.e. by conventional double image stereoscopic cameras).

It is to be understood that the separate elements shown in FIGS. 2–4 may be combined in a single monolithic structure, such as a prism, without departing from the teachings of the present invention. Similarly, anti-reflective coatings may be employed on the surfaces of the light reflecting and light transmitting elements to reduce distortion created by refraction.

Figure 6:
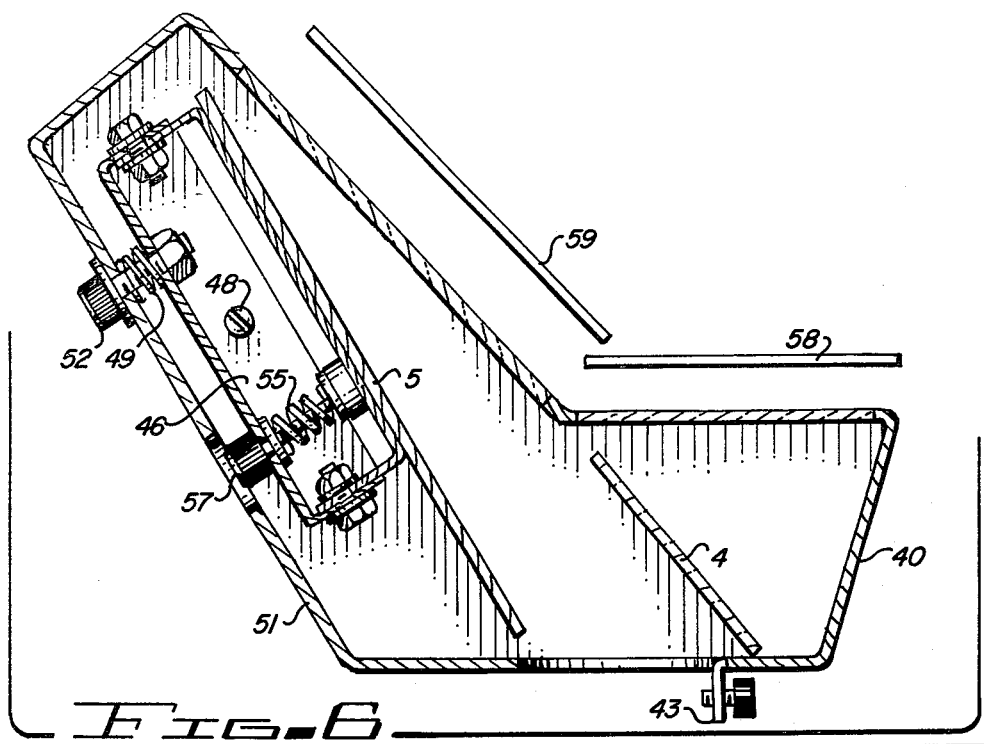
FIg. 6 illustrates a cross-sectional view of the apparatus taken along lines 6—6, as shown in FIG. 5.

As shown in further detail in FIGS. 5 and 6 housing 40 contains the various previously discussed light transmissive and light reflective elements of FIGS. 1–4 as well as the various filters when the latter are employed. An aperture 42 is disposed in the rear surface 41 to receive the lens system of a camera. Retaining elements, representatively shown and identified by numeral 43 secure the housing 40 to the lens system. It is to be understood that the retaining means 43 may be varied to suit particular applications.

The light transmissive element (identified in FIGS. 2, 3 and 4 as element 14, 24, 34, respectively) is normally firmly lodged within housing 40 to intersect the viewing angle of the lens system 2. The reflecting element 5 (identified in FIGS. 2, 3 and 4 as element 15, 25, 35, respectively) is normally pivotably mounted within housing 40 by mounting mechanism 45. It is to be understood that elements 4 and 5 could be permanently, removably or adjustably mounted within housing 3 and 40.

The mounting mechanism 45 may be formed by a yoke 46 pivotally secured to base 47 at pivot point 48. A spring biased adjustment screw mechanism 49 is disposed intermediate a flange 50 extending upwardly from the base of yoke 46 and side 51 of housing 40. As is well known to those skilled in the art, the turning of screw 52 will cause yoke 46 to pivot about its pivot point 48. Thus, adjustment mechanism 49 may be used to obtain registration between the two received images.

The rear surface of reflecting element 5 includes a pair of flanges 53 and 54 extending rearwardly therefrom and forming a part of mounting mechanism 45.

Each of these flanges is pivotally mounted upon one of the arms of yoke 46. A second adjustment mechanism 55 may be disposed intermediate flange 50 extending from the base of yoke 46 and the rear surface of reflecting element 5. By turning the screw 57 of the adjustment mechanism 55, reflecting surface 5 pivots about the pivot point intermediate flanges 53 and 54 and the arms of yoke 46. In this manner, vertical alignment of the reflected element 5 with respect to the transmissive element 4 may be obtained.

The previously discussed filters may be configured to mate with the front of housing 3, as shown in FIG. 6. A first filter 58 is disposed across the light ray path striking transmissive element 4 without also impeding upon the light ray striking element 5. Similarly, a second filter 59 is secured to the front of housing 3 to intercept the light ray path striking reflective element 5 without also impeding upon the light ray strking transmissive element 4.

The present invention may also be used as a decoder to permit a person to view the positives or color prints without the need of specially filtered glasses and yet obtain the effect of a three-dimensional image. If a person holds the housing 3 in front of his eyes so that light transmissive element 5 is in front of one eye and light reflective element 4 is in front of the other eye, the light from the positive or print enters through aperture 42, the housing (or decoder) will segregate the two images. One eye will receive one image while the other eye receives the other image. As discussed above, the person's brain will attribute a sense of three-dimensionality to image viewed because of the two similar but not identical images.

It should be recognized that while the description has been concerned thus far with the primary embodiment of the invention as incorporated in apparatus for stereoscopic photography, systems represented in FIGS. 2, 3 and 4 in themselves constitute variations of a novel and versatile arrangement having potential for other applications. Each of the three arrangements of FIGS. 2, 3 and 4 constitutes a light interaction system which produces interaction between two entering rays of light. In each case, one of the incoming rays is passed through a filter before being joined with the other ray, and the composite ray delivered by the system comprises two discrete rays, each of which has been modified by the other, and each containing within its relatively narrow frequency spectrum the full range of color formation essential to recognition by the human eye.

Figure 7:
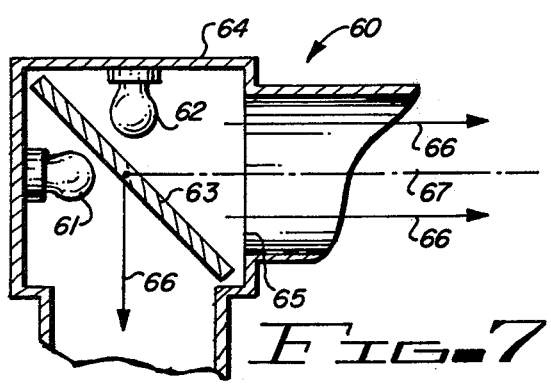
FIGS. 7, 8 and 9 illustrate other applications of the light interaction system of the invention.
Figure 8:
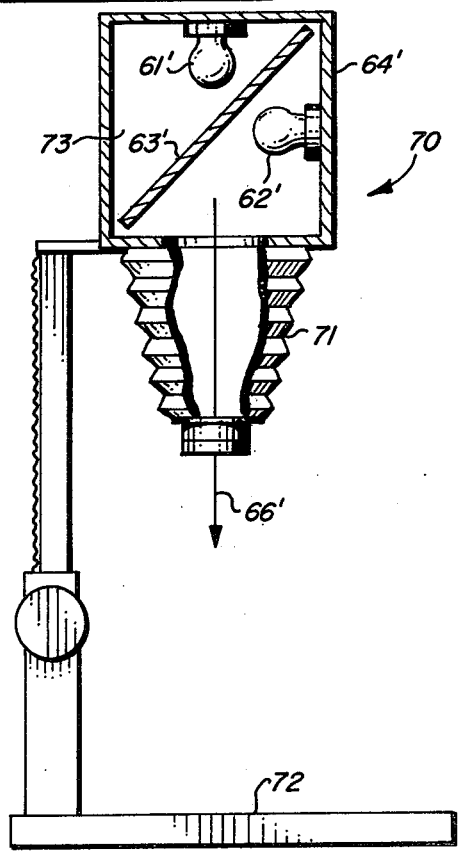
Figure 9:
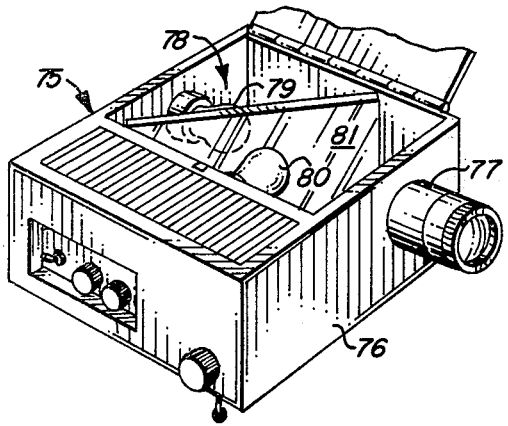

Illustrative of such other applications of these light interactions systems are the arrangements of FIGS. 7, 8 and 9.

FIG. 7 illustrates a signal or warning light 60 comprising two light sources 61 and 62 and an adjustably mountable light transmissive element 63 enclosed in a housing 64. Sources 61 and 62 may be ordinary white light sources and element 63 may be a colored glass plate, preferably a dichroic filter. The housing 64 has an aperture 65 in its forward face through which the beam of light 66 emerges along an axis 67. Element 63 is oriented at an angle of approximately 45 degrees relative to axis 67, source 61 is located rearward of element 63 on axis 67, and source 62 is located directly forward of element 63.

In the operation of warning light 60, rays of light from source 61 directed forward along axis 67 strike the rear surface of element 63. A portion of these rays is reflected downward while another portion comprising the narrow band wavelengths passed by element 63 is transmitted and continues in a forward direction along axis 67. At the same time, a portion of light rays directed from source 62 and striking the forward surface of element 63 is reflected in a forward direction along axis 67. At the forward surface of element 63 the transmitted rays from source 61 intersect and interact with the rays from source 62 so that the reflected rays from source 62 and the transmitted rays from source 61, each modified by interaction with the other, continue together along axis 67 and are emitted forwardly through aperture 65 so that the emitted light 66 is a composite of interacted rays from sources 61 and 62.

It will now be apparent in the light of earlier descriptions of the light interaction phenomenon associated with this invention that the color content of the emitted beam of light 66 may be controlled through the regulation of the relative intensities of sources 61 and 62. Thus, for example, if source 62 is reduced to zero, only the transmitted light from source 61 will be delivered and beam 66 will be red in color while the reflected beam 66 will contain a blue content. If, on the other hand, source 61 is reduced to zero, the beam 66 will take the color of the reflected portion of the light from source 62 and the transmitted color will be of a complimentary color. Intermediate colors may be produced by appropriately regulating the relative intensities of sources 61 and 62.

To apply light 60 as a traffic control light, the intensities of sources 61 and 62 may be controlled by electronic timers. If desired, color correction or compensating filters may be added to provide the desired colors in beam 66. Such filters may be located in aperture 65, or they may be located between element 63 and either or both sources 61 and 62. Alternatively, the need for such corrective filters may be obviated by an appropriate selection of types of color filters in element 63. Element 63 might consist of colored plastic, glass, infra red, dichroic, didymium or others. Element 63 could be a clear transparent element or a semi-transparent mirror with the color coming from the light source itself.

Other applications of light 60 will require different control modes or mechanisms. If it is applied as an automobile tail light, for example, relays may be utilized which operate in response to forward or rearward motion of the automobile or to braking action.

FIG. 8 illustrates another application of the light interaction system in the form of a photographic enlarger 70. Enlarger 70 comprises a conventional enlarger lens system 71 supported by a stand 72 with a light interaction system 73 serving as a color-controlled light source. System 73 is substantially identical to that of warning light 60 of FIG. 7, comprising again the two light sources 61' and 62' arranged in the same fashion about a transmissive element 63', the sources 61' and 62' and element 63' again supported within a housing 64' in a manner such that in this case the emitted beam 66' is directed downward through enlarger lens system 71. Again, the color content of beam 66' may be regulated by controlling the relative intensities of sources 61' and 62'. A second aperture may be added as in the signal light of FIG. 7.

FIG. 9 illustrates a photographic projector 75 utilizing the light interaction system of the invention as a means for controlling the color content of the projected image. Located within the housing 76 of projector 75 to the rear of the lens system 77 is the light interaction system 78, again comprising two light sources 79 and 80 and a transmissive element 81, which are operable and controllable as in the case of the light 60 and the enlarger 70.

FIGS. 10-17 diagrammatically illustrate further variations of the present invention shown in FIGS. 1-9.

Figure 10:
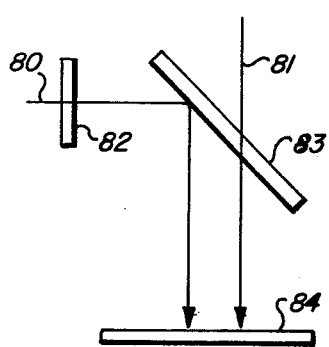
FIGS. 10-17 illustrate diagramatically further variations of the systems shown in FIGS. 1-9.

In each illustration, a pair of light beams 80 and 81 are directed to a given medium emanating from the same source but angularly displaced from each other. Light ray 80 of FIG. 10 is passed through a non-mutually exclusive color correction filter 82 which filter may be of any chosen color and is partially reflected by light reflective element 83 to display medium 84. Light ray 81 is passed through the light reflective element 83 which forms for it a filter means and the filter ray 81 is then transmitted to the display medium 84.

Figure 11:
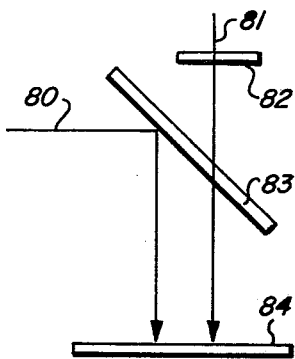

FIG. 11 represents a further modification of the invention wherein light ray 80 is partially reflected by light reflective element 83 and directed to display medium 84 while light ray 81 is passed through the non-mutually exclusive color correction filter 82 and light reflective element 83 in its travel to the display medium 84.

Figure 12:
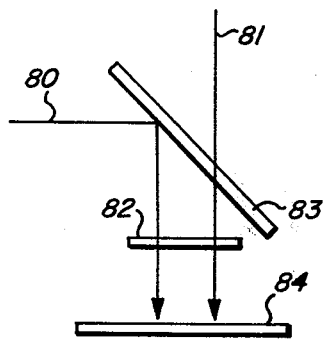

FIG. 12 illustrates a further modification of the invention wherein light ray 80 is partially reflected off of the light reflective element 83 after which the reflected portion passes through the color correction filter 82 to the display medium 84.

Light ray 81 is also directed through the light reflective medium 83, through the color correction filter 82 to the display medium 84.

Figure 13:
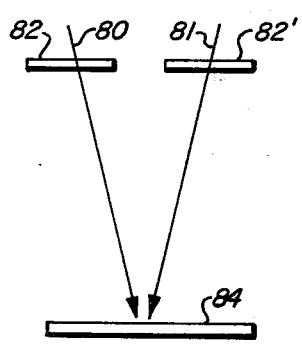

FIG. 13 illustrates a still further modification of the invention wherein both of the light beams 80 and 81 are directed through different color correction filters 82 and 82', respectively, to a common point or area on the display medium 84.

Figure 14:
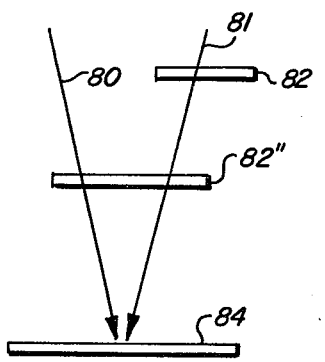

FIG. 14 illustrates a still further modification of the invention wherein light ray 81 is directed through the color correction filter 82 after which it and light ray 80 are directed through different points in a second color correction filter 82" after which they impinge on a common point or area on the display medium 84.

Figure 15:
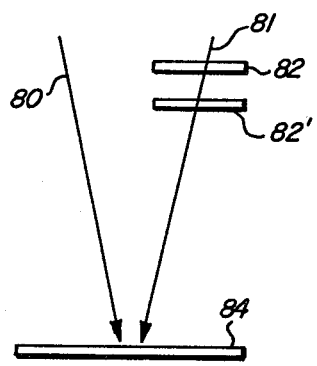

FIG. 15 illustrates a still further modification of the invention wherein light ray 81 is directed in sequence through color correction filters 82 and 82' to display medium 84 and light ray 80 is directed directly to display medium 84.

Figure 16:
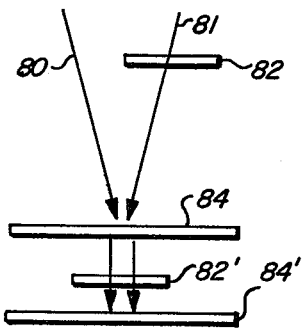

FIG. 16 illustrates another modification of the invention wherein light ray 80 is directed through display medium 84 and then through color correction filter 82' to a second display medium 84'. Light ray 81 is directed through color correction filter 82 to display medium 84 where it also is further directed through color correction filter 82' to display medium 84'.

Figure 17:
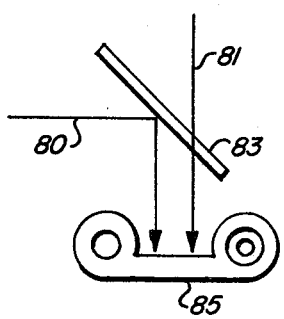

FIG. 17 illustrates still another modification of the invention wherein light ray 80 is partially reflected off of the light reflective medium 83 to a roll of film 85 which may have a color correction capability. Light ray 81 is directed through the light reflective medium 83 and to the film 85.

Figure 18:
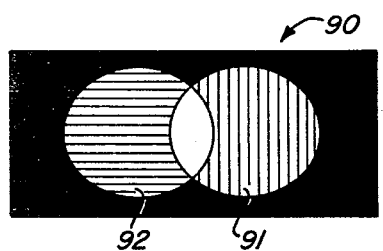
FIGS. 18 and 19 illustrate ways of artificially producing stereo color and black and white images by viewing scenes through red and blue filters.

FIG. 18 illustrates a method of artificially producing stereo color and black and white images. The scene 90 shown when viewed through a red filter causes the red image 91 to appear as a light area and image 92 as a non-light area. The opposite would appear when viewed through a blue filter. In the latter instance, the blue image would appear as a light area, the red as a non-light area. By viewing the image with a red content filter over one eye and a blue content filter over the other eye, each eye will see one light image with one color content. Through the interaction of the viewer's optical system the combination of the blue content image and the red content image will appear as white. If a percentage of red is added to the blue image then less blue light is transmitted to one eye while the full red image will be viewed by the other eye. Since the viewer's optical system is seeing more red light than blue the image will appear red. By controlling the percentage of color added to the blue or red image, various light colors will be viewed.

Figure 19:
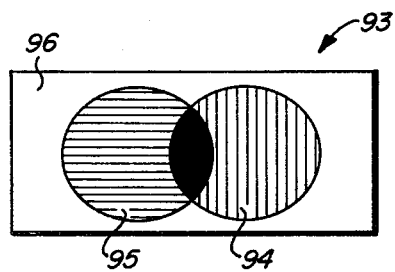

FIG. 19 illustrates a scene 93 comprising a red image 94 and a blue image 95 on a whole background 96. When a red image and a blue image appears on a white background the opposite occurrence to that shown in FIG. 18 happens. The blue image 95 when seen through the blue eye lens will not be visible whereas the red image 94 will appear as a non-light image. Through the red eye lens the red image 94 will not be visible, but the blue image 95 will appear as a non-light image. By reducing a percentage of the blue content the red eye lens will see this as a reduced red light image whereas the blue eye lens will still not see this image and still see the red image 94 as a non-light area. The optical system will see this as a dark red image. The red image can also be reduced to perform the same with the blue eye lens. If both are reduced a percentage of gray will be observed.

Figure 20:
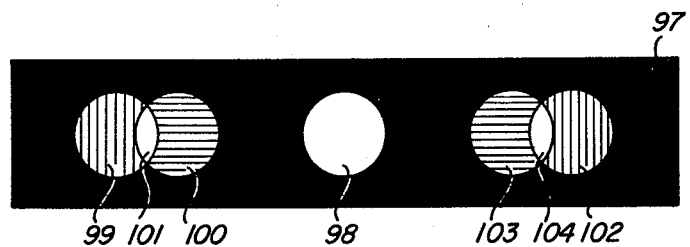
FIG. 20 discloses an optical interaction system.

Everything from non-light images to various colors, densities and tones can be produced within our physical optical interaction system. Consider, for example, as shown in FIG. 20, a black background 97 having five spots shown thereon: i.e. a white spot image 98, a combination left red spot image 99 adjacent to a blue spot image 100 with a white area 101 appearing where these two spots overlap, and a third combination comprising a red spot image 102 adjacent a blue spot image 103 with a white area 104 appearing where these two spots overlap.

By viewing these five spots through glasses with one lens containing red color content and the other lens containing a blue color content, the scene viewed will appear three-dimensional. The white spot will appear in the middle of the scene of the depth. The two other white overlapped areas 101 and 104 will also appear, one before and one behind the original white-only spot 98. By reversing the colors over each eye the white spot 98 will remain in the same position but the other two spots will have reversed their position in depth. The amount of overlap or displacement of the red and blue spots will determine the amount of optical depth perceived. It should be evident that mechanically, stereo multicolor images can be produced, displaying the image on a television screen or a recording medium.

The images of course are not limited to a spot or any other particular shape. The image can even take the form of a grid pattern.

It is evident that this stereo grid pattern can be superimposed over photos produced by the previously patented interaction light stereo sysem of U.S. Pat. No. 3,846,810 so that depth measurements can be calculated.

It is also evident that a grid pattern in combination with spots, or other shapes, would make it possible to measure the depth of each shape as well as being able to see the combination in full color, black and white and other values.

Figure 21:
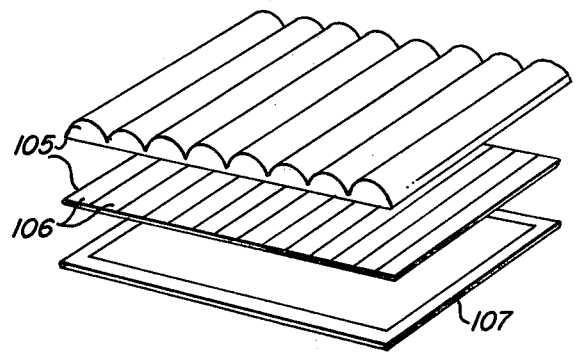
FIG. 21 discloses a lenticular film with colored strips to produce 3-D images.

FIG. 21 discloses the use of a lenticular film 105 with corresponding alternating colors, such as a red content strip followed by a blue content strip followed by a red content strip. These strips of color 106 could be printed on a surface of the lenticular film with transparent ink.

Then the film is placed over an image 107, a 3-D image will appear without the aid of glasses. Previously strips of photos have been printed on lenticular film to produce a 3-D image. This would make it possible for one film to be used for many pictures or for use on the screen of a television receiver or movie screen.

While the principles of the invention have now been made clear in an illustrative embodiment, there will be immediately obvious to those skilled in the art many modifications of structure, arrangement, proportions, elements, materials, and components used in the practice of the invention which are particularly adapted for specific environments and operating requirements without departing from those principles of from the scope of the appended claims.

What is claimed is:

1. An apparatus for simultaneously combining one image of an object with another image of the object comprising:
    a color filter means,
    a first means for directing a first image of the object along a first light ray path through said filter means to form a color filtered image ray,
    a second means for directing a second image of the object along a second light ray path and forming a second light ray,
    a display medium for receiving the color filtered image ray and said second light ray,
    a color compensating filter means, and
    a third means for directing the image displayed on said display medium through said color compensating filter means to form a non-anaglyph, full-colored composite image from the interaction of said color filtered image ray and said second light ray having a three-dimensional appearance on a displaying means.

2. The apparatus set forth in claim 1 wherein, said first means directs said second image of the object along a second light light ray path that intersects said color filtered image ray, and said display medium receives the intersected color filtered image ray and said second light ray.

3. An apparatus for receiving more than one image of an object comprising:
    a color filter means,
    a first means for directing one image of the object along a first light ray path through said filter means to form a color filtered image ray.
    a color compensating filter means,
    a second means for directing a second image of the object along a second light ray path through said color compensating filter means to form a second light ray, and
    a display means for receiving the color filtered image ray and said second light ray after passing through said color compensating filter means to form a colored composite image from the interaction of said color filtered image ray and said second light ray having full color appearance on said display means,
    said second means directes said colored filtered image ray and said second image of the object along said second light ray path through said compensating means.

4. The apparatus set forth in claim 3 wherein: said display means receives the color filtered image ray and said second light ray after passing through said color compensating filter means to form a colored composite image having a three-dimensional appearance.

* * * * *

UNITED STATES PATENT OFFICE
CERTIFICATE OF CORRECTION

Patent No. 4,133,602      Dated January 9, 1979

Inventor(s) James E. Ihms

It is certified that error appears in the above-identified patent and that said Letters Patent are hereby corrected as shown below:

Claim 3, line 6, cancel "." and substitute ---,---.

Claim 3, line 19, cancel "directes" and substitute ---directs---.

Signed and Sealed this

Seventeenth Day of April 1979

[SEAL]

Attest:

RUTH C. MASON
Attesting Officer

DONALD W. BANNER
Commissioner of Patents and Trademarks